United States Patent Office 3,520,579
Patented July 14, 1970

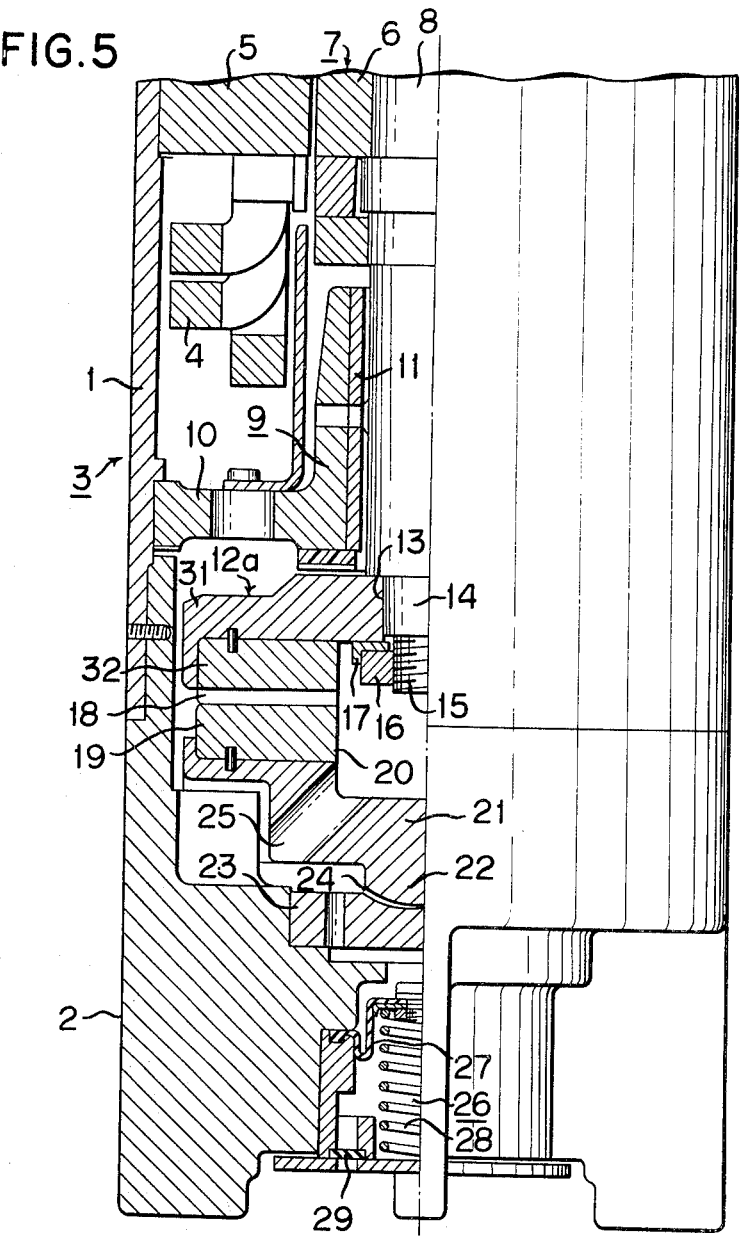

3,520,579
HIGH-LOAD THRUST BEARING OF SMALL DIAMETER
Kinpei Okano and Masanori Matsuo, Hitachi-shi, Masayoshi Isomoto, Ichikawa-shi, and Kengo Hasegawa, Narashino-shi, Japan, assignors to Kabushiki Kaisha Hitachi Seisakusho, Chuyoda-ku, Tokyo-to, Japan
Filed Apr. 4, 1968, Ser. No. 718,662
Claims priority, application Japan, Apr. 7, 1967, 42/21,817; Oct. 23, 1967, 42/67,850, 42/89,426
Int. Cl. F16c 17/16
U.S. Cl. 308—160          11 Claims

ABSTRACT OF THE DISCLOSURE

The sliding surface of a thrust runner of a thrust bearing in sliding contact with a thrust pad is provided with radial grooves for pumping and circulating a lubricant in which the thrust bearing is completely immersed, the parts of the sliding surface between adjacent grooves being crowned, and the thrust pad being pivotally supported to provide an excellent lubricating film. As a further refinement, the thrust runner and (or) the pad are (is) made elastically flexible to adjust the thrust load transmission distribution to conform optionally to the relative sliding speed distribution and thereby to afford an even higher allowable load.

BACKGROUND OF THE INVENTION

This invention relates generally to the field of rotational bearings for rotating parts of mechanisms and more particularly to thrust bearings. More specifically, the invention concerns a new thrust bearing of high thrust-load capacity ranging from a few hundred kilograms to a few metric tons suitable for use in machines such as submersible motors of deep-well pumps.

The load imparted to a shaft bearing may be divided into a thrust load and a radial load, the absolute values and the proportions (or ratio) of which vary with the conditions of use. Where the ratio of the thrust load to the radial load is small, an ordinary radial bearing with or without a slight modification can be used. On the other hand, as the ratio of the thrust load to the radial load increases, and the absolute value of the thrust load also becomes large, a separate thrust bearing becomes necessary.

Thrust bearings of large load capacity involve numerous technical problems, which have been steadily overcome in the past, and such bearings have been developed to an advanced degree where few problems remain. Thrust bearings for low thrust loads involve relatively few technical problems.

However, thrust bearings which are required to resist exceptionally high thrust loads of the order of from several hundreds of kilograms to several tons are accompanied by difficult problems. The adoption of a construction for high-load thrust bearings, while not involving technical problems, introduces the difficult problem of cost and is thereby restricted. On the other hand, the adoption of a construction for low-load thrust bearings results in a bearing of great bulk, which cannot be used practically in applications wherein space dimensions are limited.

A representative example of such applications is the thrust bearing in a submersible motor installed in a deep-well pump. Such a thrust bearing must be limited in diameter because of the nature of a deep-well pump, and yet, as the motor output capacity increases, the thrust load also increases. Accordingly, in this case, it is necessary to increase the allowable thrust load without, of course, increasing the size of the thrust bearing.

The conventional thrust bearing used heretofore in a submersible motor of the above mentioned type has a structural organization wherein a stationary thrust bearing (or pad) is confronted and contacted by a thrust runner fixed to the motor shaft, the thrust load being received and resisted by the contacting surfaces. A bearing of such organization has a low allowable load in relation to its size and, while being satisfactory for motors of low output, cannot withstand the thrusts in motors of high output.

SUMMARY OF THE INVENTION

It is an object of the present invention to provide a thrust bearing wherein, by facilitating the formation of an excellent lubricating film, the allowable thrust load is greatly increased.

Another object of the invention is to provide a thrust bearing capable of effectively operating even under lubrication of the sliding surfaces by a low-viscosity lubricant such as water as in the case of a submersible motor.

Still another object of the invention is to provide a thrust bearing wherein ample cooling is afforded to remove heat generated by friction between sliding parts thereof.

A further object of the invention is to provide a thrust bearing of simple construction which can be easily and inexpensively fabricated.

A still further object of the invention is to provide a thrust bearing wherein, through an improvement in the load distributions at all parts of the bearing sliding surfaces, the allowable thrust load of the thrust bearing as a whole is greatly increased.

An additional object of the invention is to provide a thrust bearing which is highly suitable for use in a submersible motor, more particularly in a submersible-motor pump of the type used as a deep-well pump.

According to the present invention, briefly summarized, there is provided a thrust bearing for a rotary shaft, characterized by the combination of a thrust runner fixed to the rotary shaft and having a sliding thrust-imparting surface provided with a plurality of lubricant-passage grooves extending from its central part to its outer periphery, an annular thrust pad having a sliding thrust-bearing surface in sliding contact with the thrust-imparting surface and having a central hole communicating with the inner ends of the lubricant-passage grooves, a metal holder supporting the thrust pad, an outer frame supporting the metal holder and forming a leak-proof enclosure around and apart from the above named parts of the thrust bearing, and a lubricant filling the interior of the outer frame thereby to cause total immersion therein of the parts of the thrust bearing other than the outer frame, lubricant passageways being provided in the metal holder and/or the thrust runner to provide lubricant communication between the central hole of the thrust pad metal and the exterior of the assembly of the thrust runner, thrust pad, and metal holder thereby to permit circulation of the lubricant caused by the pumping action of the thrust runner and its grooves.

The nature, principle, details, and utility of the invention will be more clearly apparent from the following detailed description with respect to preferred embodiments of the invention when read in conjunction with the accompanying drawings, in which like parts are designated by like reference numerals.

BRIEF DESCRIPTION OF THE DRAWINGS

In the drawings.

FIG. 4 is a fragmentary sectional view taken along the cylindrical surface indicated by arcuate line IV—IV in FIG. 2;

FIG. 5 is a side view, similar to FIG. 1, showing another embodiment of the invention;

DETAILED DESCRIPTION

Figure 1:
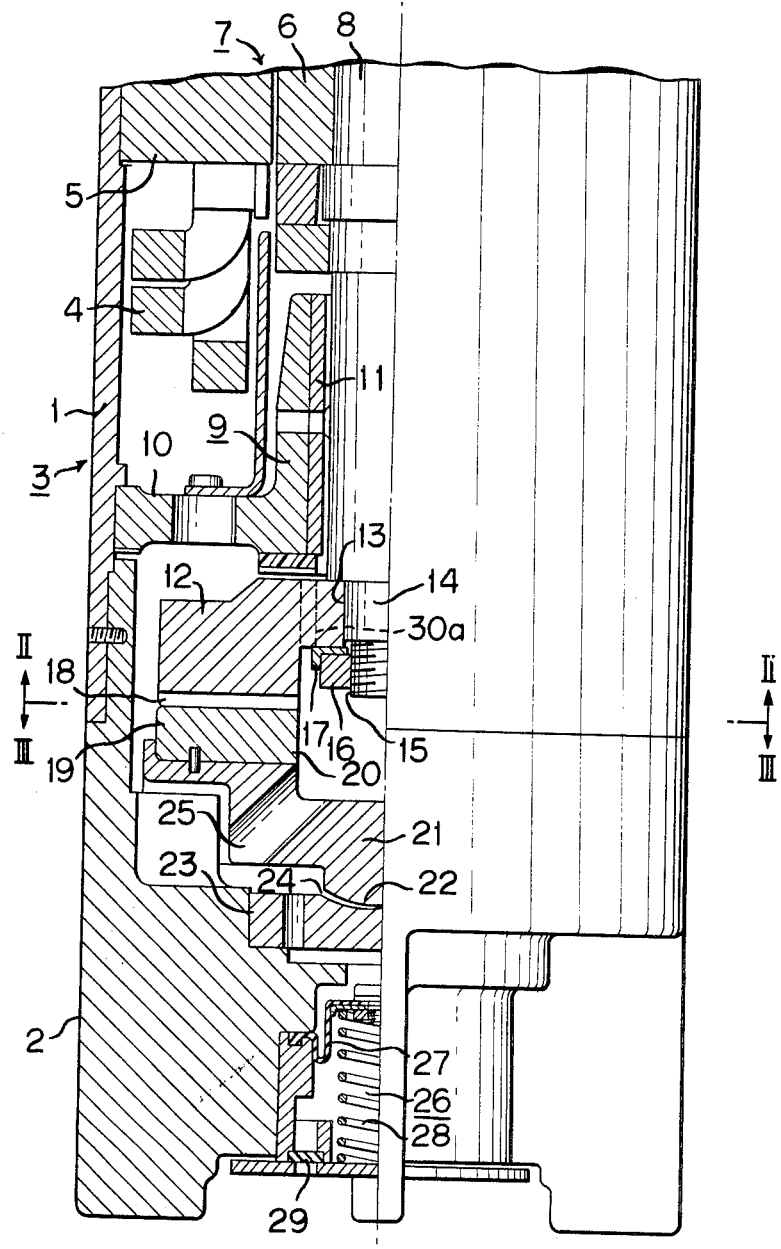
FIG. 1 is a side view, with the left half in longitudinal section, showing one example of a thrust bearing according to the invention as applied to a submersible motor.

The thrust bearing shown in FIGS. 1 through 4 is used in a submersible motor of a deep-well pump as a typical example of application of the invention. The motor, radial bearings, and thrust bearing are fully enclosed within an outer frame 3 comprising a cylindrical housing 1 and an end bracket 2 fitted into and closing the lower end of the housing 1.

The upper part of the outer frame 3 houses the motor 7 comprising, essentially, a stator 5 having an exciting winding 4, a rotor 6 disposed coaxially and rotatably within the stator 5, and a rotor shaft 8 vertically disposed and fixedly supporting the rotor 6. The shaft 8 is radially supported at a part thereof immediately below the motor 7 by a radial guide bearing 9 comprising a metal bearing 11 contacting the shaft 8 and a holder 10 supporting the metal bearing 11 and fixed to a part of the housing 1 near the lower end thereof.

The shaft 8 is provided at its lower part with a stepped, reduced diameter part 14 and a threaded part 15 therebelow. A thrust runner 12 of disk shape with a central hole 13 is fitted coaxially onto the part 14 of the shaft 8 and secured in place by a nut 16 screwed onto the threaded part 15 and holding the thrust runner 12 through a lock washer 17 interposed therebetween and bent against one side of the nut 16 to lock the same.

Figure 2:
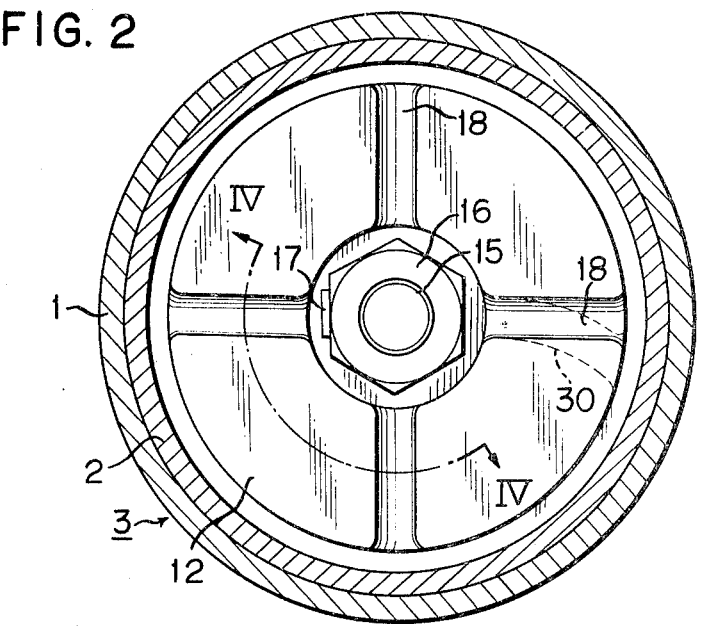
FIG. 2 is a cross sectional view taken along the plane indicated by line II—II and in the indicated arrow direction in FIG. 1.
Figure 3:
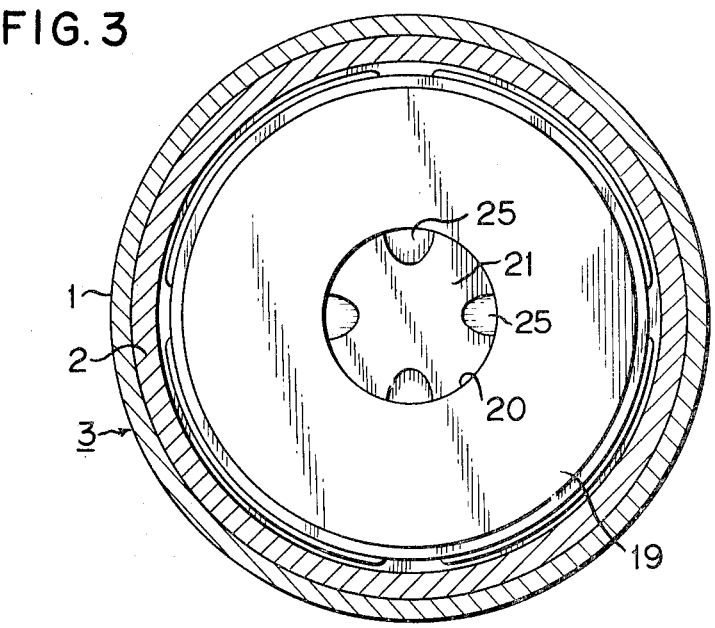
FIG. 3 is a cross sectional view taken along the plane indicated by line III—III and in the indicated arrow direction in FIG. 1.

The thrust runner 12 is provided on its lower downwardly facing surface with a plurality of radial grooves 18 extending from its central part toward its peripheral part as indicated best in FIGS. 2 and 4. Each of these grooves 18 may be of radially straight configuration, or it may extend toward the periphery of the thrust runner 12 in a path curved in the direction opposite the direction of rotation of the thrust runner as indicated by dotted line 30 in FIG. 2.

The thrust runner 12 is confronted and supported at its lower surface by a metal thrust pad 19 of disk shape which is provided with a central hole 20. The metal pad 19 is supported in turn and held by a metal holder 21 having a lower reduced diameter end with a convex spherical surface 22, which bears against a concave spherical surface 24 on the upper part of a seat plate 23 mounted on the end bracket 2 at the center thereof, the surface 24 being of a slightly greater radius of spherical curvature than the surface 22.

The thrust runner 12, thrust pad 19, metal holder 21, and seat plate 23 in coaxial combination constitute an example of the thrust bearing according to the invention. In the normal state of this thrust bearing, the metal holder 21 is supported with the central part of the surface 22 thereof in contact with the central part of the surface 24 of the seat plate 23. The metal holder 21 is provided with a plurality of through passage-holes 25 through which the central hole 20 of the thrust pad 19 communicates with the exterior of the thrust bearing.

The spaces and cavities between the outer frame 3 and the thrust bearing and between the above described parts of the thrust bearing are filled with a lubricant (water in this example) to cool the various heat generating parts and, at the same time, to accomplish lubrication of the bearing parts. Since this water undergoes repetitions of expansion and contraction due to temperature changes, an absorbing device 26 for absorbing this expansion and contraction is provided at the lower end of the outer frame 3 in the end bracket 2.

This absorbing device 26 comprises, essentially, a bellows diaphragm 27 made of a resilient material such as rubber and constituting a tight yet flexible seal between the interior and exterior of the outer frame 3, a spring 28 for constantly pressing inward against the diaphragm 27 to cause the pressure within the frame 3 to be slightly higher than the outside pressure, parts for holding the absorbing device in assembled state in the end bracket 2, and a filter screen 29 for preventing foreign matter such as sand, dust, and dirt from entering the device.

The thrust bearing of the above described organization according to the invention operates in the following manner. Prior to starting the motor 7, the spaces within the outer frame 3 are completely filled with water. Then the exciting coil 4 of the motor is energized, whereupon the motor rotor 6 is subjected to driving torque and causes the shaft 8 to rotate. The radial direction forces to which this shaft 8 is subjected are resisted by the radial guide bearing 9, whereby the shaft 8 is caused to rotate about the rotational axis determined by the radial bearing 9.

On one hand, a pump (not shown) is coupled to the upper part of the shaft 8. Consequently, a thrust load equal to the sum of the weights of the pump rotor, including its impellers and shaft, the motor rotor, and the motor shaft 8, and the thrust due to the pumping action of the pump is imposed on the motor shaft 8 and transmitted through the thrust runner 12 to be received and borne by the thrust pad 19.

Since the thrust runner 12 is rotating at the same rotational speed as the shaft 8, the grooves 18 provided on the lower surface of the thrust runner impart to the water therein a centrifugal pumping action whereby the water near the central part of the thrust runner is sent radially outward. At the same time, water is sent also into the interstice between the thrust runner 12 and the thrust pad 19 to form therebetween a lubricating film of water.

Thus, the thrust runner and thrust pad are in a state of relative motion with liquid friction due to a lubricant interposed therebetween, in which state the power loss is lower and the rate of abrasive wear is also lower than in the case of metal-to-metal friction. As the water in the region near the center of the thrust pad 19 is sent outward, the water on the outer side is supplied through the holes 25 of the metal holder 21 into the central cavity formed partly by the hole 20 of the metal pad 19. Thus, the water is continually circulated.

The ideal operational state of the thrust bearing is that in which the axis of the rotating shaft 8 and the sliding interface between the thrust runner 12 and the thrust pad 19 are in exact perpendicularity relative to each other. This ideal state cannot be fully attained in practice because of inevitable inaccuracies in fabrication. For this reason, the lower end of the metal holder 21 is formed with a spherical surface 22 (convex), and the mating surface 24 of the seat plate 23 for receiving the surface is also a spherical surface (concave), whereby the metal holder 21 is pivotally supported. By this construction, the metal holder 21 can freely tilt within a certain angular range. Thus, inclinations relative to the rotational axis of the sliding interface between the thrust runner 12 and the thrust pad 19 can be absorbed.

Each of the regions of the sliding surface of the thrust runner 12 between adjacent grooves 18 is formed with a slight crown as indicated in FIG. 4, the crest of the crown extending in the radial direction. It has been found that this surface configuration improves the formation of the lubrication film of the lubricant, whereby an even greater thrust load can be imposed on the thrust bearing without causing a break in the lubrication film. As a result of experiments, we have found that a crown height of from 2 to 5 microns produces good results.

As a means for replenishing the lubricant to the central part of the thrust pad 19, the hole 25 is provided in the metal holder 21 as described hereinabove. In addition, it is also possible to provide a communication hole in the thrust runner 12 in the position indicated by dotted line 30a in FIG. 1 and to replenish the lubricant therethrough.

In general, consideration is given to the possibility of breakage of the lubricating film in the thrust bearing, and, accordingly, at least one of the sliding surfaces is made of a material which, itself, has good bearing performance. In another embodiment of the invention as illustrated in FIG. 5, the thrust runner 12a is composed of two separate but secured parts which are assembled together through a suitable means such as stopper pins, and, if further required with an adhesive agent, to prevent possible rotation between the two parts, namely, a runner frame 31 and a sliding disk 32. The runner frame 31 is constructed of a structural material of high strength, while the sliding disk 32 is made of a highly lubricible bearing material, that is, a soft and easily workable material, and is in the shape of an annular ring. The sliding surface of the sliding disk is provided with radial grooves 18 as in the thrust runner 12 of the first-described example.

While there are no particular limitations to the materials for use as such lubricible bearing material, representative examples of suitable materials are so-called white metal, alloys composed principally of lead and graphite, copper alloys such as Phosphor bronze, gun metal, lead bronze, and copper-lead alloys, cadmium alloys, and powder sintered alloys such as those of copper and iron. For the thrust pad material having high wear-resistant and anti-corrosive properties such as stainless steel and other ferrous metal alloys can be used.

By fabricating the sliding disk 32 of such a material, the radial grooves can be formed much more easily than in a steel sliding disk. Accordingly, these materials are highly suitable and convenient, particularly in cases where the grooves are not straight but are to be of a special shape for improving the formation of the lubricating film. Furthermore, when a soft material is used, burrs which may be formed during the fabrication process can be readily removed, whereby the possibility of scoring or other damage to the sliding surface due to such burrs is eliminated.

Figure 6:
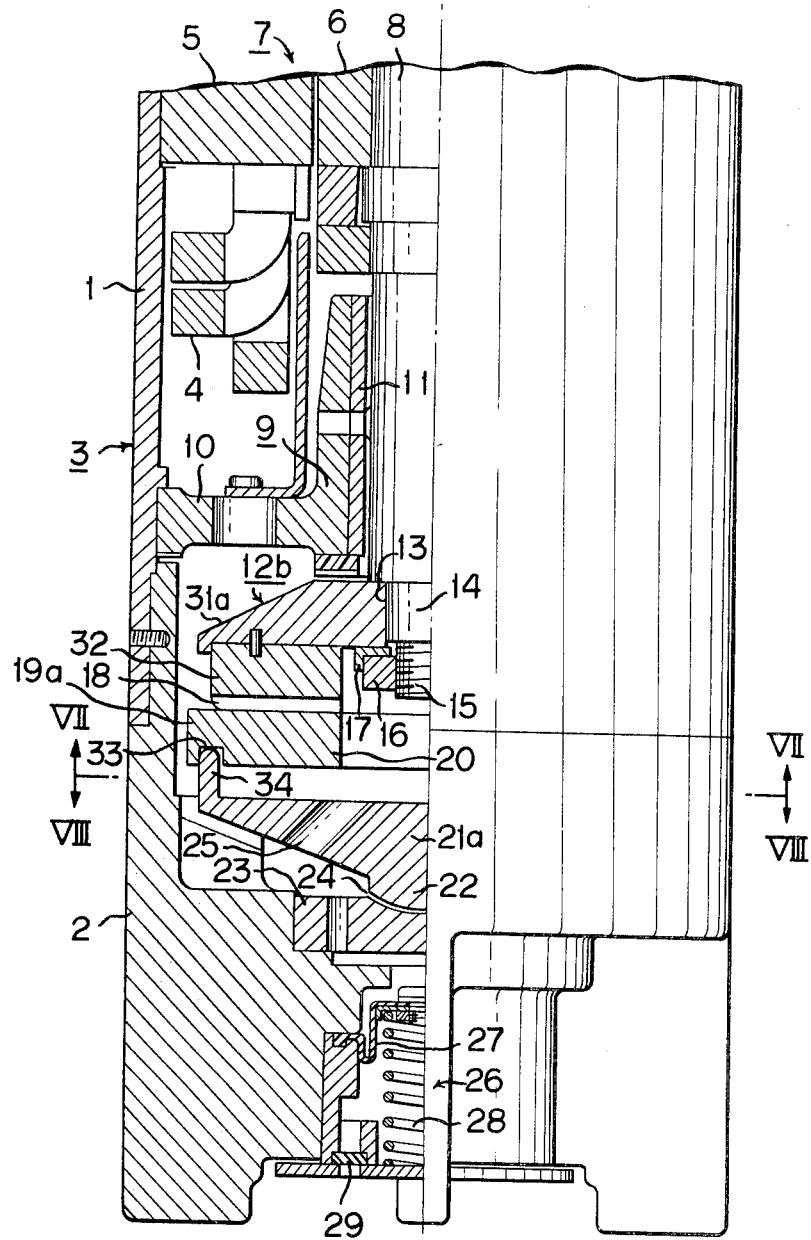
FIG. 6 is a side view, similar to FIG. 1, showing still another embodiment of the invention.
Figure 7:
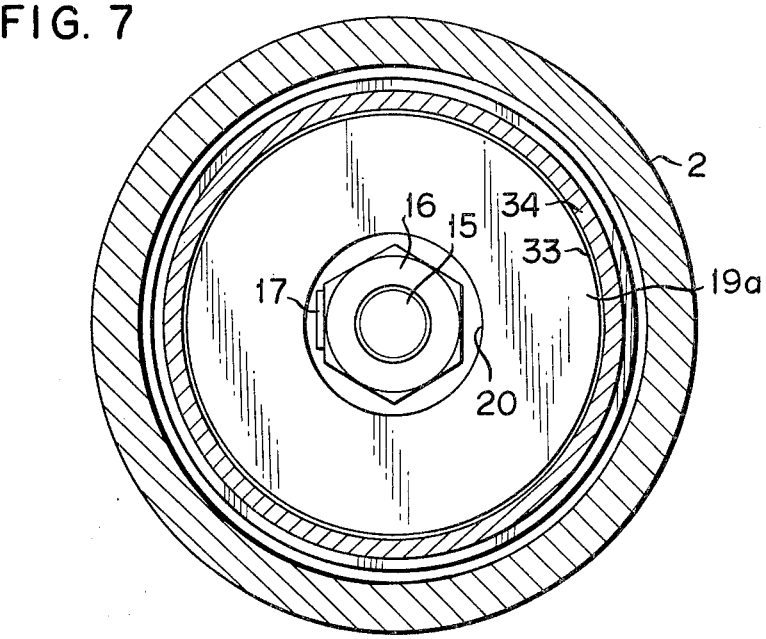
FIG. 7 is a cross-sectional view taken along the plane indicated by line VII—VII and in the indicated arrow direction in FIG. 6.
Figure 8:
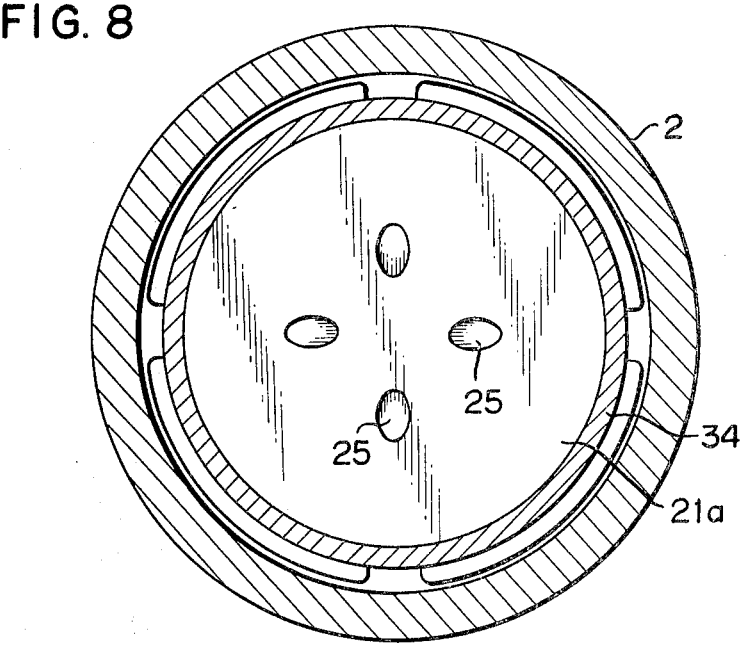
FIG. 8 is a cross-sectional view taken along the plane indicated by line VIII—VIII and in the indicated arrow direction in FIG. 6.

In still another embodiment of the invention as illustrated in FIGS. 6, 7, and 8, the thrust pad 19a and the supporting metal holder 21a differ from those of the above described examples in that an annular groove 33 is provided in the lower surface of the thrust pad 19a near its outer periphery and is engaged by a raised annular ridge or rim 34 formed around the upper part of the metal holder 21a near its outer periphery. The other parts of this thrust bearing are similar to those of the examples illustrated in FIGS. 1, 2, and 3 and FIG. 5.

By this construction, a concentrated thrust load is imposed on the central part of the thrust runner 12b, but a distributed load is imposed on the thrust pad 19a on the side receiving the load from the thrust runner side since the thrust pad 19a is supported at a part thereof near its periphery. Accordingly, when the sliding contact interface is considered, it is apparent that this thrust bearing, differing from those of the aforedescribed examples, operates with the sliding interface deformed into the shape of an inverted cone.

Then, when the relationship between the relative rotational speed between the sliding surfaces and the allowable thrust load is considered, it is apparent that the allowable load increases as the relative speed increases, even when the other conditions remain constant. That is, as the relative speed increases, the possibility of breakage of the lubricating film decreases. Accordingly, in the thrust bearing of this example, the thrust load (as stress per unit area) in the central region of low relative speed is comparatively small, and the thrust load increases outward toward the peripheral region, where the relative speed is comparatively high.

Thus, it is possible to apply a load equivalent to the maximum allowable load over the entire sliding interface, each region thereof bearing the maximum allowable unit load for the relative speed of that region. As a total result, therefore, a large thrust load can be effectively borne by a thrust bearing of small size.

Figure 9:
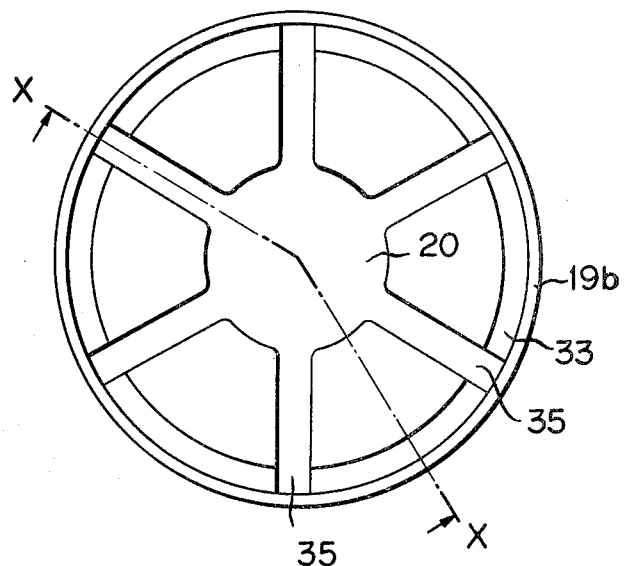
FIG. 9 is a plan view showing a thrust pad metal constituting a component of a further embodiment of the invention.
Figure 10:
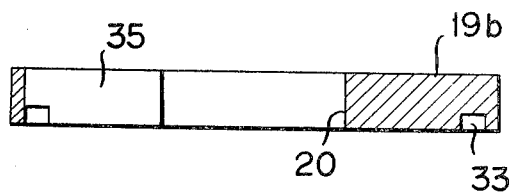
FIG. 10 is a sectional view taken along the bent surface indicated by bent line X—X in FIG. 9.

In a further embodiment of the invention as illustrated in FIGS. 9 and 10 and representing a further refinement, a plurality of cut out slots 35 extending radially from the central hole 20 of the thrust pad 19b to points near the outer periphery thereof are provided. By the provision of these slots 35, adjustment of the unit thrust load applied in and near the central part of the thrust pad 19b is facilitated, and, accordingly, design and fabrication of the thrust bearing are facilitated.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

We claim:

1. A rotary machine having a vertical shaft and a thrust bearing for said shaft, said thrust bearing comprising a disk-shaped thrust runner fixed to the rotary shaft, said thrust runner having a surface with a plurality of grooves, against which thrust load is imparted, each of said grooves extending radially from the center of the runner to the outer periphery thereof to provide communication between the central part and the exterior of the thrust runner; an annular metal thrust pad beneath said runner and having a planar surface facing the grooved surface of said thrust runner, said planar surface being continuous and ungrooved, said pad being provided with a central hole; a holder for said thrust pad having a passageway to provide communication between said central hole of the thrust pad with the exterior of the thrust runner; an outer frame supporting the holder and forming an enclosure around the thrust runner, thrust pad and holder; and a non-oil lubricating liquid having a degree of viscosity as that of water filled in the outer frame to cause said runner, thrust pad and holder to be immersed therein, whereby the liquid is circulated from said central hole through said radial grooves to the exterior of the thrust runner by centrifugal force and then back to the central hole via said passageway in the holder, said liquid forming a stable lubricating film between the thrust pad and the runner.

2. A thrust bearing as claimed in claim 1 comprising a resilient absorbing device in said frame and bounding said enclosure to compensate expansion and contraction of the lubricant due to temperature changes.

3. A thrust bearing according to claim 1, in which said thrust runner is constituted by a disk-shaped sliding plate made of a highly lubricible bearing material and provided on one surface thereof facing said planar surface of said thrust pad with said plurality of grooves, the peripheral part of said thrust pad being supported by the holder, and the sliding contact interface between the thrust runner and the thrust pad assumes a conical shape under thrust load during operation.

4. A thrust bearing according to claim 1, in which the thrust runner is provided on one surface thereof facing one surface of the thrust pad with said plurality of grooves extending radially from its central part to its outer periphery to communicate the central part and the exterior of the thrust runner and said grooves being curved in the direction opposite that of rotation of the thrust runner as they extend from the central part to the outer periphery thereof.

5. A thrust bearing according to claim 1, in which said thrust runner is constituted by a disk-shaped sliding plate made of a highly lubricible bearing material and provided on one surface thereof facing said planar surface of the thrust pad with said plurality of grooves, and a runner frame fixed to the rotary shaft together with the disk-shaped sliding plate and supporting said sliding plate.

6. A thrust bearing according to claim 1, in which the peripheral part of said thrust pad is supported by the holder, whereby the sliding surfaces of said thrust runner and thrust pad assume a conical shape in their operating conditions.

7. A thrust bearing according to claim 1, in which the thrust pad is provided with cut-out slots at its lower side extending from its central part to the points near its outer peripheral edge which is supported by the holder.

8. A thrust bearing according to claim 1 comprising means pivotably supporting said holder with respect to the outer frame.

9. A thrust bearing according to claim 1, in which said thrust runner is further provided with a passageway communicating the exterior of the thrust runner to the inner ends of said grooves.

10. A thrust bearing according to claim 1, in which the sliding surfaces between the adjacent grooves of the thrust runner are formed with crowns so as to cause the center part thereof to crest.

11. A thrust runner according to claim 1, in which the thrust runner is constituted by a disk-shaped sliding plate made of highly lubricible material selected from the group consisting of white metal, alloys composed principally of lead and graphite, copper alloys, cadmium alloys, and powder sintered alloys, and provided on one surface thereof facing said planar surface of the thrust pad with said plurality of grooves, and a runner frame fixed to the rotary shaft and supporting the sliding disk, said thrust pad being made of stainless steel.

References Cited
UNITED STATES PATENTS

| | | | |
|---|---|---|---|
| 2,890,916 | 6/1959 | Maynard | 308—160 |
| 1,792,719 | 2/1931 | White | 308—160 |
| 1,544,443 | 6/1925 | Gibbs | 308—160 |
| 1,342,384 | 6/1920 | Howarth | 308—160 |

FRED C. MATTERN, JR., Primary Examiner

F. SUSKO, Assistant Examiner